C. E. FRITZ.

Magnetic Grain Separator.

No. 9,229. Reissued June 1, 1880.

Witnesses:

Seymour Scott

W. H. Jefferson.

Inventor:

Charles E. Fritz

UNITED STATES PATENT OFFICE.

CHARLES E. FRITZ, OF ONEONTA, NEW YORK.

MAGNETIC GRAIN-SEPARATOR.

SPECIFICATION forming part of Reissued Letters Patent No. 9,229, dated June 1, 1880.

Original No. 223,901, dated January 27, 1880. Application for reissue filed May 6, 1880.

*To all whom it may concern:*

Be it known that I, CHARLES E. FRITZ, of Oneonta, in the county of Otsego and State of New York, have invented a new and useful Method of Separating Iron or other Magnetic Metals from Grain or other Substances, which method is fully set forth in the following specification.

The invention relates, principally, to the method and means of removing fragments of iron, whether in the form of wire or otherwise, from wheat or other grain before grinding, or from other substances with which the iron is mingled.

It consists in first passing the grain or other substance through screens, sieves, or other suitable mechanical means for separating the larger pieces of iron, if there are any such in the mixture, then passing it through my electric or magnetic separator, by which the remainder of the iron is removed.

Heretofore grain has been passed through troughs containing permanent magnets, to which the iron would adhere, while the grain passed on. This process is objectionable, because the pieces of iron require to be removed by hand by an extra operation or process, and also because the magnets gradually lose their strength by the jarring, &c., incident to use. There are also other objections. To avoid all these I employ temporary or induced magnets, which I can charge to any required strength, and can magnetize and demagnetize as desired. The particular form of apparatus which I consider preferable for employing them in is a revolving cylinder made of wood or other non-magnetic material, having longitudinal strips or lengths of soft iron attached to the interior surface. These strips are magnetized during one portion of the revolution and demagnetized during another portion, whereby the iron adheres to the strips while magnetized, and is carried to the upper part of the cylinder. The strips are then demagnetized, and the iron drops, falling upon a trough, apron, or receptacle, down the inclined surface of which it passes to the outlet, while the cleaned grain passes out through the open end of the cylinder, and is caught in any suitable apparatus, the nature of which will depend on the disposition which is to be made of the grain. Other substances are separated from the iron mixed with them in a similar way.

Figure 1:
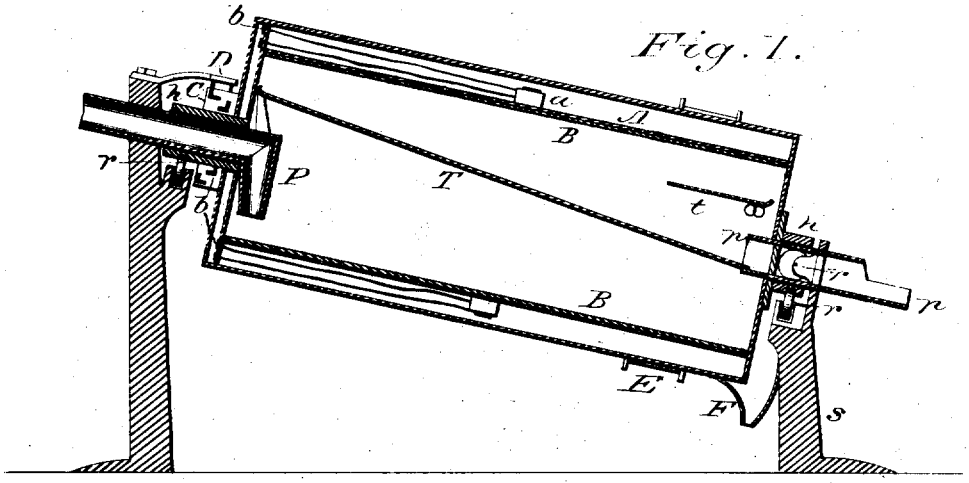
Figure 2:
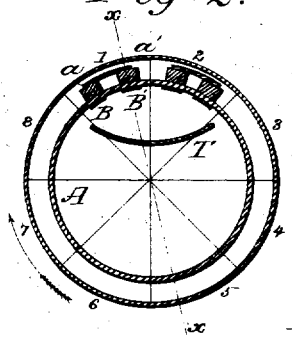
Figure 3:
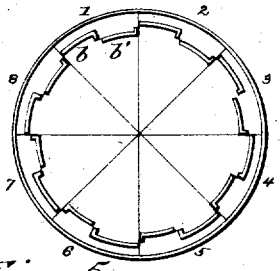
Figure 4:
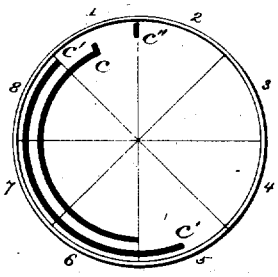
Figure 5:
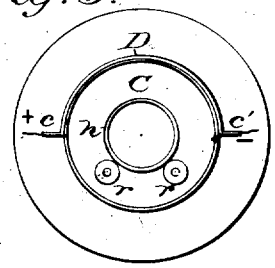
Figure 7:
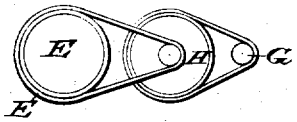
Figure 6:
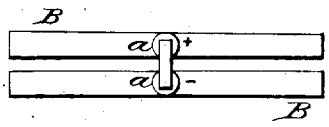

In the drawings, Figure 1 represents a vertical section of the separator in the line *x x*, Fig. 2. Fig. 2 is a transverse section through the center. Fig. 3 is an end view. Fig. 4 shows the means for properly connecting the electric wires with the magnets, &c. Fig. 5 is a view of the upper hub of the separator, with commutator, brushes, &c. Fig. 6 is a top view of an electro-magnet, *a a*, with two strips, B B, connected with its cores. Fig. 7 illustrates one method of connecting and driving the separator E and generator G from the driving-shaft H, with its pulley.

Similar letters of reference indicate corresponding parts.

The mechanical means for removing the largest fragments of iron need not be described, as any apparatus may be used which may be found most convenient, and in some cases the grain may be free from large pieces, and can be passed directly through the separator.

A in Fig. 1 represents the shell of the cylinder, which can revolve on hollow journals at the ends, in the usual manner; but I prefer that hollow hubs *h h* turn on friction-rollers *r r*, Fig. 5. The rollers not only obviate the friction consequent upon the large size of the hub, but the use of the hollow hubs also obviates the following defect: Owing to the inclined position of the cylinder, if the usual journals were used the oil would drip from the upper bearing into the interior, or run down the outside and into the spout F, and not only injure the grain, but interfere with the proper working of the apparatus.

At the lower bearing there may be, besides the upright rollers, one or more rollers bearing against the end or shoulder of the hub, to keep the separator up to its place and resist its longitudinal downward thrust. These may be advantageously placed at the top or sides of the hollow journal.

When the hubs are properly supported the feed-pipe P and the outlet-pipe *p* need not touch in their hubs at all, but pass loosely through them and be supported by the connecting parts or by the standards S of the separator.

The inlet-pipe P is connected with a hopper or reservoir containing the grain to be separated, with a gate or valve by which the supply can be regulated or shut off. The inner end of P curves down nearly to the bottom of the separator, to deliver the grain near the end of the cylinder, and also assist in spreading it thinly as it falls.

The inclination of the cylinder is sufficient to cause it to make about three revolutions before the grain is discharged from the open lower end into the trough or spout F. This is not essential, however, as, if the grain is nearly clean or the magnets very strongly charged, the grain can be cleaned in one revolution. The apparatus can therefore be constructed to operate on the material as rapidly as desired, by increasing the inclination of the cylinder and also the strength of the magnets.

The axis of the separator may be horizontal and the outlet end be made larger than the other, to give the necessary inclination for carrying out the grain.

T is a trough, apron, or receptacle for catching the iron reaching across nearly the entire width of the separator, and from one end thereof to the other, properly supported on the stationary pipes P and *p*. The middle of this trough inclines, as shown, from about two-thirds of the diameter of the cylinder down to the bottom of the outlet-pipe *p*. The edges, however, may be nearly at the same height from end to end.

B B are strips of soft iron attached to the interior of the shell A of the cylinder, Figs. 1, 2, and 6, longitudinally, being best arranged around the cylinder so as to be magnetized alternately positively and negatively. These strips are of any suitable number, depending on the diameter of the cylinder and the power of the magnets.

The drawings show sixteen strips connected to eight magnets. They may have a smooth surface, but are better to be corrugated, the edges slightly turned upward, or to have their surface formed in projections of any kind for stirring the grain and insuring contact with the fragments of wire. To these strips are firmly attached the ends of the cores of a series of electro-magnets, of suitable construction and of equal strength, secured to the shell A. The ends of the wires of the two coils *a a* are led to and connected with the contact-pieces *b b*, Figs. 1 and 3, one for each coil.

When the current is sent through the two contact-pieces *b b'* and the two coils *a a'* of magnet 1, the two strips B B' in contact with its cores are magnetized by induction—one positively, the other negatively.

For convenience in showing the connections, Figs. 2, 3, and 4 are divided into eight imaginary sections, each one having a magnet, two coils, *a a'*, two strips, B B', and two contact-pieces, *b b'*, corresponding to the coils.

The current is sent through the magnets in sections 5, 6, 7, and 8, and is shut off from those in sections 1, 2, 3, and 4.

The cylinder revolves in the direction of the arrow, and as each magnet comes into the position of section 5 the current is sent through it, and it continues charged till it reaches the position of section 1, when its strip B is well over the edge of the trough T. The current is then shut off from it, the strips B B' are demagnetized, and any iron adhering to the strips drops into the inclined trough and passes out through the pipe *p*.

In order to insure the dropping of the iron at the instant that the current is shut off from the magnet 1, it is reversed momentarily, giving the strips an opposite polarity, and having the effect to repel the iron.

The current is sent through the proper magnets by means of two curved brushes, *c c'*, arranged in contact with the contact-pieces of the magnets. The brush *c* is connected with the positive wire, *c'* with the negative. The current divides in the brushes, going equally through the different magnets whose contact-pieces are touched by the brushes. In magnet 1 it passes from *c* to *b'*, to *a'*, to *a*, thence back to *b*, and out through *c'* to the battery or other source of electricity; and the same with magnets 6, 7, and 8. Consequently it passes successively through all the magnet-coils as they come into section 5, and continues to flow through them till they reach section 1, when contact with the brushes ends and the current is shut off from them.

The current is reversed by the means shown in Figs. 3 and 4. At the forward ends of the contact-pieces the two series are prolonged toward each other. The forward end of the brush *c* is similarly widened. There is a corresponding widening at *c''* for the brush *c'*, and electrically connected therewith, but not continuous with it. These widenings are not prolonged far enough to reach the other circle either of brushes or contact-pieces, but so that the projection of one can reach over and make good contact with the other, as shown.

The contact-pieces *b b'* of magnet 1, Fig. 3, have just gone out of contact with the brushes, and in the position shown the brush *c''* is in contact with the side projection, *b'*, and *c* with *b*, thus sending the current through the magnet 1 in the opposite direction to that in which it had up to that instant been flowing.

By lengthening the lower ends of the brushes they will connect sooner with the magnets, and by shortening the upper ends they will disconnect sooner; but the proportions shown will generally be found sufficient.

In practice, however, it will be found better to have the contact-pieces on a smaller cylinder or commutator, C, arranged on the hub of the separator instead of on the end. The cylinder is of ebonite or other suitable non-conducting material, and the contact-pieces are properly fixed in its surface in two circles, as before.

The wires from the magnets, properly insulated, run to the end of the separator-cylinder and inward to connect with their corresponding contact-pieces. These are not placed in the same sections of the commutator as their magnets, but so that the brushes can occupy the upper half of the circle, as shown in Figs. 5 and 1, where D is a segment of non-conducting material, carrying the two brushes, insulated from each other, and arranged to rest in contact with their respective circles of contact-pieces, as before described. This segment D is attached to some adjoining stationary part, so that it can be adjusted in position and brought up to the commutator as the brushes wear, or readily removed for repairs, or for the substitution of new brushes, &c.

Fig. 1 shows the contact-pieces *b b'* both in the position of Fig. 3, and on the commutator C, as in Fig. 5. The magnets and their wires are entirely covered by the outer casing of the cylinder, so that they cannot be disturbed or injured while the machine is in use.

In order to test whether the separator is too much inclined for the strength of the magnets, or if the grain is fed in too rapidly, I attach a flat plate or supplementary trough, *t*, to the lower end of the trough T, and above the latter. Should any considerable quantity of iron drop on this plate the strength of the current should be increased or the feed of the grain be diminished by the gate or valve at the inlet P; but if it catches little or none the working is correct. This plate can be seen through the open lower end of the separator. It is attacked by its lower edge to the sides of the trough T, and is held up to its place by a spring or counterpoise, so that it can be caused to discharge whatever it has caught by pushing down its upper edge; or it may be arranged in any other suitable manner.

The contact-pieces must, of course, be kept clean, the connections of the different wires to them and to the magnets unbroken and properly insulated, and the brushes in condition to make good contacts with all the contact-pieces as they come under them. To test whether these points are correct, reach a piece of soft-iron wire in through the open end of the separator, and by touching the strips which are magnetized it can be felt whether the wire is held or not; or a handful of iron fragments can be thrown in while the separator is turning, and before opening the feed for the grain, to see if they are promptly gathered up and caught in the trough T.

If any particular strips B need to be more strongly magnetized than others, or for any reason it is desirable to divide the current differently, each strip or each set can have its own circle of contact-pieces on the commutator, and the brushes and wires be arranged to produce the particular effect desired, in conformity with the general system before described.

I do not confine myself to the precise forms and arrangements shown, but any equivalent construction which will accomplish the same results may be used For example, instead of the magnets being connected with the strips B at or near the middle, as shown, they may be attached at their ends; but the former method is preferable, unless the strips are quite short. The strips can also be arranged around the cylinder instead of longitudinally; but in that case they should not be longer than can discharge at one time into the trough. The commutator can then be arranged to reverse the current as each set of strips comes exactly over the trough.

Instead of employing electro-magnets to induce magnetism in the strips, as described, the thin shell A of the separator can be wound with insulated wire, making it a large hollow coil, inducing magnetism in the strips when the current passes through the wire. In this case the commutator should be arranged to reverse the direction of the current about three times to each revolution of the separator, so that as each sectional one-third of the surface came over the trough, it would be caused to discharge the iron it had carried up.

Instead of electro-magnets or a wire coil for magnetizing the strips, permanent magnets may be used, the poles of which set on contact-pieces connected directly to the strips, substantially as shown in Fig. 6. These magnets should either be of the horseshoe form, or at least have their ends or poles bent a little out of straight line. The coils *a a'* around the contact or pole pieces are then used to neutralize or reverse the inductive action of the magnets on the strips B B', by sending a current through them in the proper direction when they arrive in the position shown in Fig. 2, and thereby cause the discharge of the iron fragments, as already described.

The coils can be dispensed with, if desired, and any suitable means used for neutralizing, preventing, or reversing the induction action of the magnets on the soft-iron strips at the proper times, by removing their poles from the contact pieces or strips, or otherwise.

As the different magnets came over the trough, a projecting arm or lever connected with any convenient adjacent stationary fixture would cause the magnets to slide off those contact-pieces and onto others, and so reverse the polarity of the strips, or merely demagnetize them, as preferred. In the latter case another arm or incline would replace the magnets as they were lowered on the side by the turning of the cylinder.

The magnets can be arranged inside and the strips for attracting the wires be placed on the outside of the separator, and operate in substantially the same way; but I regard the construction described as better, as an internal surface is more convenient, better adapted to secure a thorough cleaning, and the action is more under control in every way than an external one, whether the latter is cylindrical, curved, or plane.

The same effect can be produced in substantially the same way by using permanent magnets directly for attracting and seizing the iron, and at the proper time causing them to face or pass the similar poles of other magnets of equal or greater strength near their other ends, thus practically neutralizing or reversing their magnetism, and causing them to release and discharge the iron; but I do not consider this method as desirable as that with temporary or induced magnets, for the effect will be to more or less rapidly destroy or reverse their permanent magnetism.

It is an improvement to add another series of stationary permanent magnets so placed as to add to their power during the time they are holding the fragments of wire. They will also tend to preserve or increase the strength of the movable magnets. This arrangement can be applied to the trough-separator described farther on.

Still another method of applying the principle of my invention is, instead of using permanent magnets or magnetized strips to seize the iron, to distribute a naked conducting-wire over the surface of the cylinder, the different coils or lengths being insulated from each other and from the cylinder. When the current is sent through this wire it becomes in effect one long magnet, and will attract and hold the fragments of iron, as described before, till the current is broken at the proper time, when the iron will drop. The wire may be laid either to and fro from one end of the cylinder to the other, the different lengths being nearly parallel, or it may be wound around the cylinder the same as the iron strips. The quasi magnetism of the wire is reversed by reversing the direction of the current passing through it.

The commutator described and shown in the drawings, although very convenient, is by no means the only available construction; but any suitable means for properly making and breaking the connections may be employed for operating the separator.

The separator may be revolved by belting or gearing; but the latter is preferable, as the slight jarring produced by it assists the iron fragments to slide down the trough T; but if permanent magnets are used belting would be better, as the jarring would weaken the magnets. The pulley or gearing can be applied to either end of the separator, or the belt can be run around the separator cylinder itself as a pulley, as shown at E in Fig. 1.

The connection between the separator and the dynamo-electric machine may be direct by belting or gearing, or be made indirectly through intermediate shafting, &c. The latter is preferable on account of the difference between the speeds of the two. As the generator G, Fig. 7, makes about seven hundred revolutions per minute, while the separator E will make, say, five to ten, it would be difficult to connect them directly, but is easily done by intermediate shafting, as shown in the figure. This connection, as before observed, may be made by belting, gearing, or any suitable means. If the speeds of the generator and the separator are not to be varied in the same proportion, the pulleys, &c., are arranged to produce the desired difference.

The electric current for charging the electro-magnets may be supplied by a battery or by a dynamo-electric machine of any suitable construction. The machine is preferable, as it is less troublesome, and can better be taken care of by unskilled persons, and its speed can be so arranged in proportion to that of the separator as to furnish a current of any strength required. When so arranged, if the separator should be turned faster the machine will also turn proportionately faster, furnishing the same quantity of current to each revolution of the former, by which means the separator may be caused to clean a much greater quantity of grain per hour.

The machine must be arranged to furnish a constant and not an alternating current, so that the strips B on the rising side, when magnetized, shall remain so till they come over the trough T, as a break in the current before that time would drop the iron back into the grain.

There are many other ways, unnecessary to describe, of applying this principle of my invention, which consists in separating and holding the fragments of iron by means of magnets in the form of strips, wires, or bars, whether permanent, temporary, or induced, whose magnetism is then automatically overcome, neutralized, discharged, or reversed at such times that the iron they have seized will be dropped into a suitable receptacle separate from the grain or other substance with which it had been mixed. It therefore does not include the use of magnets for gathering the iron, for that is old; but only the magnets in connection with the means for utilizing them, substantially as I have described, whether the separator be internal, external, or of any other shape.

The different variations of form and arrangement in the several parts suggested in this specification can, of course, be combined with each other in an operative separator in any particular manner preferred, so long as the principle of my invention is not departed from.

Having thus described my invention, I hereby reserve, as subject of future application, all matters not expressly claimed herein.

What I claim as new, and desire to secure by Letters Patent, is—

1. In apparatus for separating iron or other magnetic metals from grain or other non-magnetic substances, the combination of a gravity feed produced by rotary motion, a series of magnets, and means for discharging, overcoming, neutralizing, or reversing their magnetism at the proper times.

2. An internal magnetic separator consisting of a longitudinally-inclined revolving-cylinder having soft-metal strips or pieces arranged on its inner surface, means for magnetizing and demagnetizing them at the proper times, and a trough within the cylinder for catching the iron fragments and discharging them separately from the grain, all being so constructed and arranged that the strips or pieces seize the iron while in the grain, carry it up over the trough, and discharge it therein, while the clean grain passes on and out at the lower end of the cylinder.

3. A self-feeding magnetic separator consisting of a longitudinally-inclined revolving cylinder provided with temporary or induced magnets, means for magnetizing and demagnetizing them at the proper times, and a trough for catching the iron fragments, and having the discharge end lower than the other by an amount that will cause the feeding to proceed at the desired rate without requiring mechanical means for forcing the material along.

4. The combination of a magnetic separator or apparatus for separating iron from grain or other substances, a magneto-electric or dynamo-electric machine furnishing a current of proper strength, and belting, gearing, or other suitable connection between them, for automatically regulating the speed of the electric generator by that of the separator.

5. The combination of a longitudinally-inclined self-feeding internal magnetic separator with a series of soft-metal strips or pieces for seizing the iron, arranged on its inner surface, and means for magnetizing and demagnetizing them at the proper times.

6. The combination of a longitudinally-inclined self-feeding internal magnetic separator, a series of magnets outside of the separator, a series of soft-metal strips or pieces arranged on its inner surface and connected with the poles of the magnets, and means for automatically neutralizing, overcoming, discharging, renewing, or reversing the magnetism of the strips or pieces at the proper times.

7. The combination, with a revolving cylinder, of a series of temporary or induced magnets arranged on its interior surface, means for magnetizing and demagnetizing them at the proper times, and a trough or receptacle within the cylinder for catching the iron fragments, substantially as and for the purposes set forth.

8. In a separator, the combination of a revolving cylinder, a series of magnets outside of the cylinder, a series of metal strips or pieces connected with the poles of the magnets and arranged on the interior surface of the cylinder, means for directing, breaking, closing, and reversing the electric current, a trough or receptacle within the cylinder for the iron fragments, and a dynamo-electric machine or other source of electricity.

9. The combination of a cylinder revolving on hollow hubs, and having an inlet, P, and an outlet, *p*, a series of magnets outside of the cylinder, a series of soft-iron strips or pieces connected with the magnets and arranged on the interior surface of the cylinder, a circular commutator and segment, with brushes or contact-makers, both arranged at the same end of the cylinder, a trough within the cylinder, discharging through the outlet *p*, and a dynamo-electric machine or other source of electricity, substantially as and for the purposes set forth.

10. In a separator, a commutator and a segment, both at the same end of the cylinder, the commutator having two circles of contact-pieces, arranged in pairs, one pair for the magnet or magnets of each soft-iron strip, each contact-piece having one or more side projections toward the other circle, the segment having two insulated brushes corresponding to the two circles connected with the two poles of the source of electricity, and each brush wide enough to touch the projections on the contact-pieces of the other circle, the whole being constructed and arranged substantially as herein described, for sending the current through such wires or coils in such directions and for such times as may be desired.

11. The method of separating iron from grain by inducing magnetism in soft-iron strips or pieces by means of permanent magnets, which strips or pieces seize and hold the iron fragments while in or near the grain, but are demagnetized and drop the iron after they are out of the grain.

12. A separator-cylinder revolving on hollow hubs, in combination with inlet P, outlet *p*, and a trough or receptacle, T.

13. A revolving magnetic separator having in its interior a stationary trough or receptacle for catching the iron, supported on or by the inlet and outlet pipes, so that it remains in the same position while the cylinder is revolving around it.

14. The combination, with the trough T, of a supplementary receptacle, *t*, for testing the perfection of the cleaning.

CHARLES E. FRITZ.

In presence of—
GEO. KIRKLAND,
SEYMOUR SCOTT.